Figure 1:
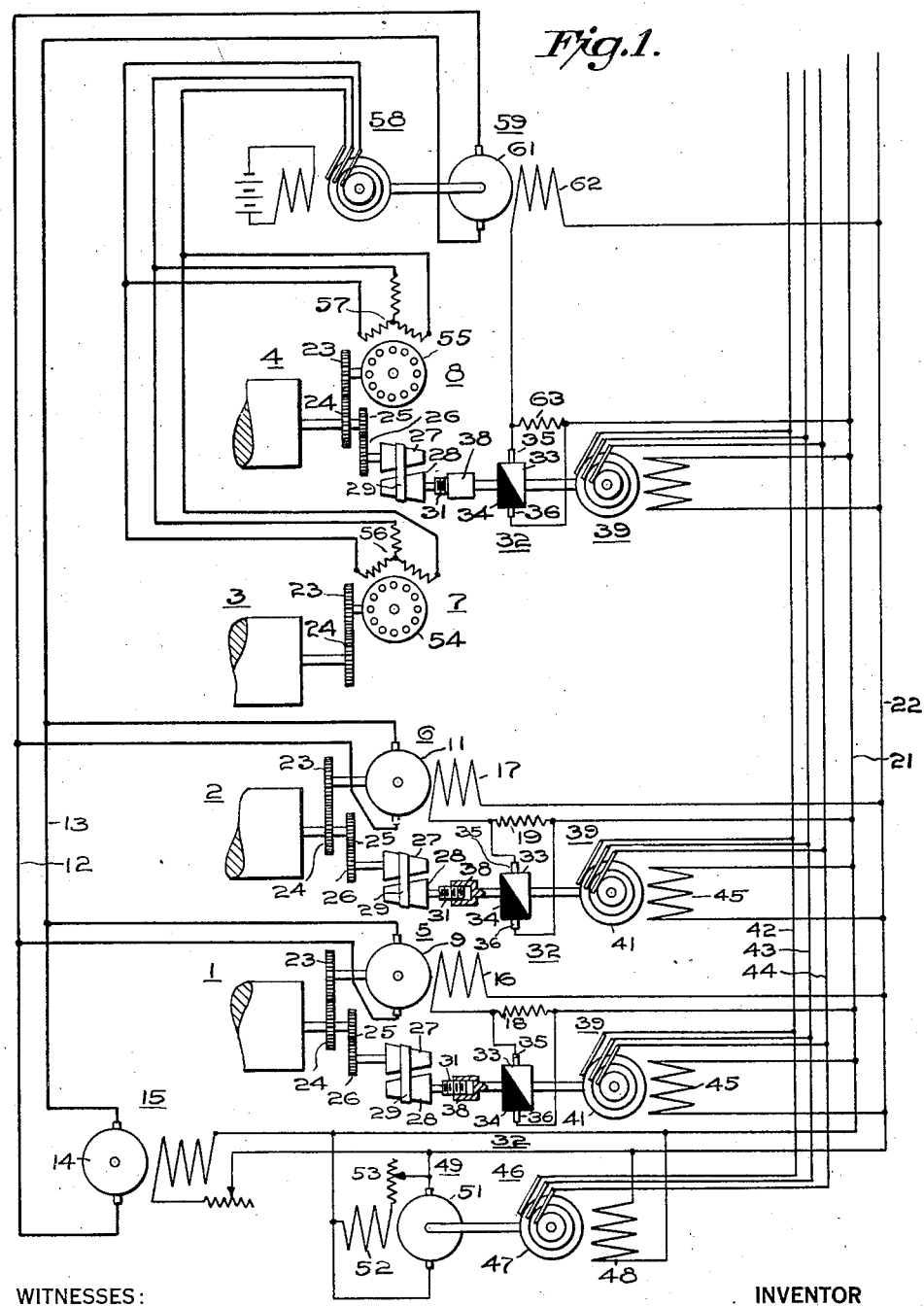

June 17, 1930.  S. A. STAEGE  1,764,422
SPEED REGULATOR SYSTEM
Filed April 15, 1926   2 Sheets-Sheet 1

WITNESSES:
R. S. Harrison
J. E. Hardy

INVENTOR
Stephen A. Staege
BY
Wesley G. Carr
ATTORNEY

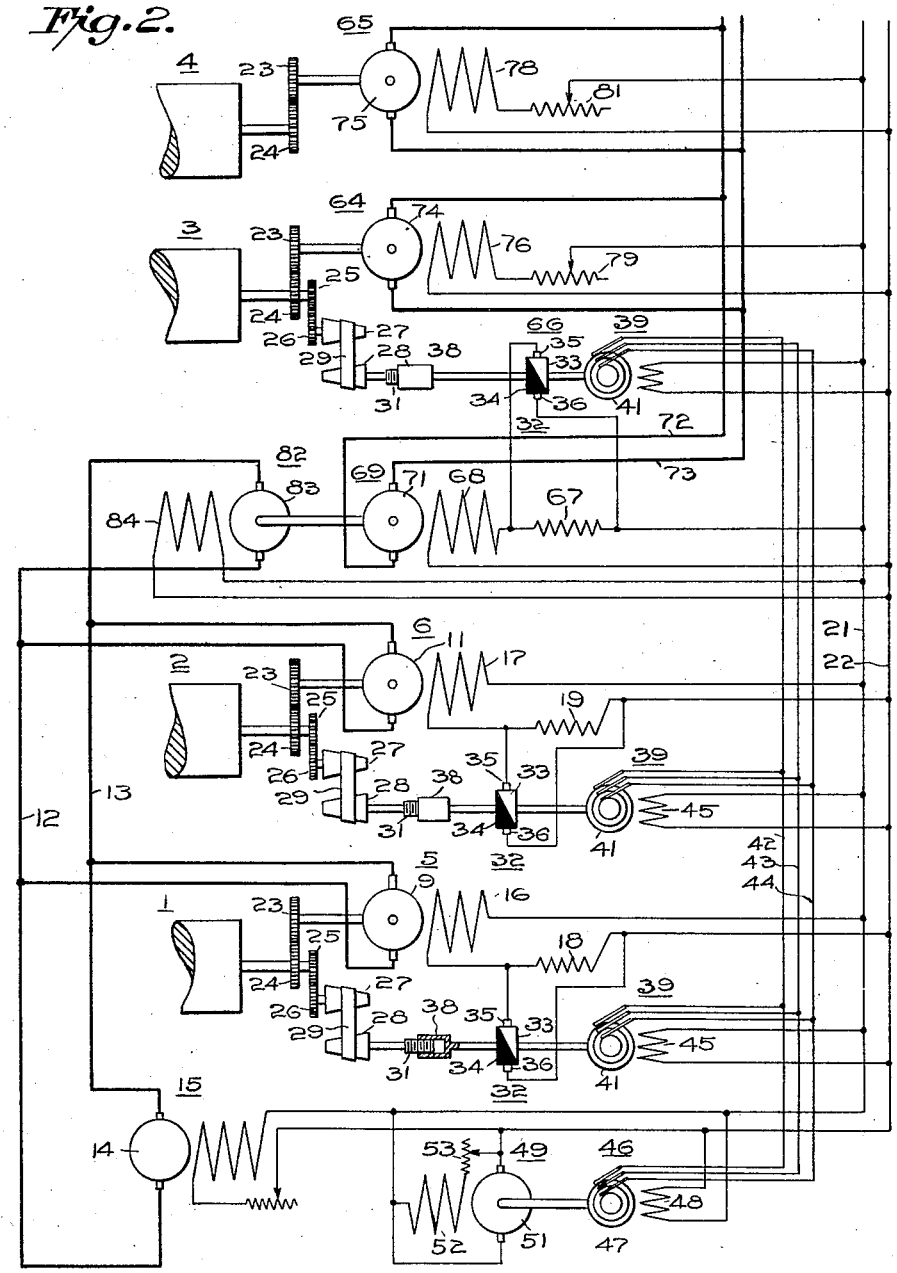

Patented June 17, 1930

1,764,422

UNITED STATES PATENT OFFICE

STEPHEN A. STAEGE, OF PITTSBURGH, PENNSYLVANIA, ASSIGNOR TO WESTINGHOUSE ELECTRIC & MANUFACTURING COMPANY, A CORPORATION OF PENNSYLVANIA

SPEED-REGULATOR SYSTEM

Application filed April 15, 1926. Serial No. 102,169.

My invention relates to sectional electric drives for machines having a plurality of rotative members that are required to run in a predetermined speed relationship, and more particularly to the speed regulation of such drives.

My invention has special application for driving the rolls of a paper-making machine, wherein a plurality of electric motors are used for driving the several sections of the machine. In such machine, the several sections of rolls are required to operate at a predetermined speed relation that varies slightly from synchronism because of the elongation of the paper stock during the process of manufacture.

In paper-making machines, the raw material or stock is supplied to what is known as the "wet end" of the machine, where it is collected by suitable devices into a thin sheet in a moistened state. This sheet is conveyed to the succeeding sections of the machine through the couch rolls, press rolls, drier rolls, and calender rolls and finally wound on a reel. In this operation, part of the moisture is pressed out of the wet sheet and part of it is dried out; the sheet receives a smooth surface and is wound upon the roll.

The speed of the several section motors may be controlled by any well known speed-regulating system, such as that described in my copending application, Serial No. 743,577, filed October 14, 1924 and assigned to the Westinghouse Electric & Manufacturing Company.

The drier rolls of a paper-making machine should run in substantial synchronism, since there is substantially no elongation or contraction of the paper while passing between these rolls. It has been proposed to provide a plurality of synchronous motors for driving the several drier rolls of a paper-making machine to supply these motors with current from an alternating-current generator that was connected to be driven by a direct-current motor. The motor driving the alternating current generator was one of a plurality of direct-current section motors that were employed for driving the several sections of the paper-making machine.

The drier rolls are provided with a "felt," which is an endless belt of felt, or similar material, which passes over the rolls in contact with the paper for portions of its travel. The felt passes over the drier rolls, and presses the paper against the heated steel rolls. Since the felt absorbs or gives up moisture, according to the conditions of operation, it shrinks or stretches to a certain degree and, under some conditions of operation, the pull on the rolls may become sufficient to pull a synchronous motor out of step with the other synchronous motors, since any variation from the correct speed under such conditions is cumulative.

One object of my invention is, therefore, to provide an electric drive system wherein a plurality of driven motors are maintained in a desired speed relation.

Another object of my invention is to provide a system of the above-indicated character, wherein the drier driving motors are connected together with sufficient flexibility to prevent desynchronizing, and each motor is regulated to run in the desired speed harmony with the other motors of the machine.

According to one form of my invention, the drier rolls are operated by alternating-current asynchronous motors, which are connected to an alternating-current generator that is driven by a direct-current motor, the speed of which is regulated in accordance with the speed of one of the drier rolls.

According to another form of my invention, the drier rolls are driven by direct-current motors, the speeds of which are regulated by a common speed regulator that is actuated in accordance with the speed of one of the drier rolls.

In the accompanying drawing,

Figure 1 is a diagrammatic view of apparatus and circuits organized in accordance with the first-mentioned form of my invention, and Fig. 2 is a diagrammatic view of apparatus and circuits organized in accordance with the second-mentioned form of my invention.

Referring to Fig. 1 of the drawing, a plurality of rolls 1, 2, 3 and 4 are illustrated as driven, respectively, by direct current motors 5 and 6 and alternating-current asynchronous motors 7 and 8. The rolls 1 and 2 are representative of the plurality of rolls through which the paper stock is rolled out during the manufacturing process, only two being illustrated, while rolls 3 and 4 are illustrative of the drier rolls, only two being here illustrated.

The direct-current driving motors 5 and 6 are provided, respectively, with armature windings 9 and 11 that are connected, by means of variable-voltage direct-current conductors 12 and 13, to the armature 14 of a direct-current generator 15, and are also provided with field windings 16 and 17 that are connected to constant-voltage conductors 21 and 22.

The motors 5 and 6 are connected, respectively, to the rolls 1 and 2 by any suitable gearing, such as gear-wheels 23 and 24, and are further respectively connected by means of gear-wheels 25 and 26, cone pulleys 27 and 28, and a belt 29, to one element 31 of a speed regulator. One form of speed regulator comprises a rotary contact drum 32, having conducting and non-conducting surface portions 33 and 34, respectively, that engage brushes 35 and 36 which are connected to opposite sides of a field resistor 18 or 19.

The rotary contact drum 32 is provided with a nut 38 that engages a screw member 31 to form a differential device for axially sliding the drum 32. The drum 32 and the nut 38 are driven by the synchronous motor 39.

The synchronous motor 39 is provided with a three-phase armature winding 41 that is connected to supply conductors 42, 43 and 44 and with a direct-current field winding 45 that is connected to the constant-voltage conductors 21 and 22.

The conductors 42, 43 and 44 are supplied with alternating-current from an alternator 46 that is provided with an armature winding 47 and a field winding 48. The alternator 46 is driven by a direct-current motor 49 that is provided with an armature winding 51 and a field winding 52, which is connected in series relation with a variable resistor 53. The speed of the alternator 46 determines the speeds of the several synchronous motors 39 and, consequently, the speeds of the several section motors 5, 6, 7 and 8.

The asynchronous motors 7 and 8, for driving the rolls 3 and 4 of the drier, may be three-phase induction motors provided, respectively, with rotor windings 54 and 55 and with stator windings 56 and 57. The stator windings 56 and 57 are connected to an alternator 58 that is driven by a direct-current motor 59. The motor 59 is provided with an armature winding 61 that is connected to the direct-current variable-voltage conductors 12 and 13 and with a field winding 62 that is connected, through a resistor 63, to the constant voltage direct-current conductors 21 and 22. A rotary contact drum 32 is connected in shunt relation to the resistor 63, in the same manner as that described with relation to the resistors 18 and 19, and is actuated in accordance with the speed of one of the drier rolls 4 and the associated synchronous motor 39, to vary the effective value of the resistor 63.

The operation of the system is as follows: So long as the screw 31 and the nut 38 of each differential device rotate at the same speed, the associated contact drum 32 will remain in the same position with respect to the brush 35; and the resistor 18, 19, or 63, associated with the several rotary contactors, will be intermittently short-circuited for a given proportion of time during each rotation of the contactor.

Should the associated roll vary from its desired speed, with respect to the alternator 46, which is determined for each section by the position of the corresponding belt 29 upon the cone pulleys 27 and 28, a difference in speed will occur between the cooperating screw and nut 31 and 38, respectively, causing the corresponding rotary contact drum 32 to be actuated to the right or to the left with respect to the brushes 35 and 36. This movement of the contact drum 32 changes the proportion of time during each rotation that the associated resistor will be short-circuited and correspondingly varies the effective value of the resistor, thereby changing the speed of the given section motor.

The speed of the direct-current motor 59 is regulated in accordance with variations in the effective value of the field resistor 63, as one of the section motors of the machine, and the speed of the motor 59 determines the frequency generated by the alternator 58 and applied to the stator windings of the induction motors 7 and 8 and, consequently, also determines the speeds of the motors 7 and 8. The regulator comprising the rotary contact drum 32 that governs the effective value of the resistor 63, in the field winding circuit of the motor 59, is actuated in accordance with the speed of one of the drier rolls 4, so that it is effective to regulate the speed of the roll with respect to the associated synchronous motor 39, to maintain the desired speed of the drier section of the machine.

Inasmuch as the motors 7 and 8 are induction motors and do not run in synchronism with the current supplied to them, but have a slip frequency, the motor 59 will, in order to provide the necessary slip frequency, run at a speed somewhat higher than would be necessary if it were directly connected to the drier rolls. Also, since the motors 7 and 8 are induction machines, a certain speed variation, of negligible importance so far as the speed of the paper through the rolls is concerned, is permitted. This slight variation of speed between the motors driving the rolls of the drier section allows for the necessary speed variation to accommodate the shrinking and stretching of the felt and prevents the motors from falling out of synchronism.

Referring to Fig. 2 of the drawing, the rolls 1, 2, 3 and 4 correspond to the similarly numbered rolls of Fig. 1, and the motors 5 and 6 are similar in construction and operation to the motors 5 and 6 described in Fig. 1. In place of the alternating-current motors 7 and 8, I here use direct-current motors 64 and 65. The speeds of the motors 64 and 65 are similarly varied by the rotary contactor drum 66 that is operated in accordance with the speed of one of the drier rolls 3 and governs the speeds of the associated direct-current motors, in any suitable manner, such as by jointly varying their field excitation or armature voltage.

As illustrated, the rotary contactor 66 governs the effective value of a resistor 67 that is connected in circuit with a field winding 68 of a direct-current generator 69 that is provided with an armature winding 71, which is connected, by means of conductors 72 and 73, to the armature windings 74 and 75, respectively, of the motors 64 and 65. The motors 64 and 65 are also provided, respectively, with field windings 76 and 78 that are connected through resistors 79 and 81 to the constant-voltage supply circuit conductors 21 and 22. The direct-current generator 69 is connected to be driven by a direct-current motor 82 that is provided with an armature winding 83, which is connected to the variable-voltage conductors 12 and 13, and with a field winding 84 that is connected to the constant-voltage conductors 21 and 22.

The rotary contactor 66 operates to govern the effective value of the resistor 67 and to thereby vary the voltage of the generator 69 that is impressed upon the armature windings of the drier roll motors 64 and 65. Inasmuch as the voltage is similarly varied for the two motors 64 and 65, which are designed to have like speed characteristics, the speeds of these motors will vary simultaneously. The variable resistors 79 and 81 in the field winding circuits of the two motors permit of manual adjustment of those circuits to allow for any slight differences in motor characteristics. Inasmuch as direct-current motors of the type here illustrated have a characteristic that permits their variation from synchronous speed without shutting down the motor, the condition above described, produced by the shrinking and stretching of the felt, does not produce any undesirable operating condition, while, at the same time, close speed regulation is effected.

Many modifications may be made in the apparatus and circuits illustrated without departing from the spirit of my invention, and I do not wish to be limited other than by the scope of the appended claims.

I claim as my invention:

1. In a regulator system wherein a plurality of members are required to run in predetermined speed relation, individual direct-current motors for driving certain of said members, individual asynchronous motors for driving certain other of said members, a generator for supplying power to said asynchronous motors, and means for regulating the speed of said generator and of said direct-current motors to maintain the desired speed relation of said members.

2. In a regulator system wherein a plurality of members are required to run in predetermined speed relation, a source of direct-current power, a plurality of motors connected to said source of power for driving certain of said members, regulator means for each of said motors for governing the speed thereof, a translating device, a plurality of asynchronous motors connected to said translating device for driving certain of said members, and regulating means actuated by one of said members for governing said translating device to control the speeds of the motors connected thereto.

In testimony whereof I have hereunto subscribed my name this 12th day of April, 1926.

STEPHEN A. STAEGE.